US008609212B2

(12) United States Patent
White et al.

(10) Patent No.: US 8,609,212 B2
(45) Date of Patent: Dec. 17, 2013

(54) SECURITY ARRANGEMENT

(75) Inventors: William Neil White, Timsbury (GB); David Brian Clouston, Duffield (GB)

(73) Assignee: Bastione Limited, Timsbury, Bath (GB)

( * ) Notice: Subject to any disclaimer, the term of this patent is extended or adjusted under 35 U.S.C. 154(b) by 90 days.

(21) Appl. No.: 13/005,470

(22) Filed: Jan. 12, 2011

(65) Prior Publication Data

US 2012/0021188 A1 Jan. 26, 2012

Related U.S. Application Data

(63) Continuation-in-part of application No. 10/552,689, filed as application No. PCT/GB2004/001540 on Apr. 8, 2004, now abandoned.

(51) Int. Cl.

*B32B 9/04* (2006.01)
*B32B 7/12* (2006.01)
*G09F 3/00* (2006.01)

(52) U.S. Cl.

USPC .......... 428/40.1; 428/41.8; 428/42.1; 428/43; 428/195.1; 428/343; 428/354

(58) Field of Classification Search

USPC ........... 428/40.1, 40.9, 41.8, 42.1, 42.2, 42.3, 428/43, 343, 195.1, 354

See application file for complete search history.

(56) References Cited

U.S. PATENT DOCUMENTS 4,121,003 A * 10/1978 Williams ..................... 428/42.1
5,127,675 A 7/1992 Moss
5,683,774 A 11/1997 Faykish et al.
5,885,677 A 3/1999 Gosselin et al.
6,214,443 B1 4/2001 Palmasi et al.
6,659,507 B2 12/2003 Banahan
7,250,191 B2 7/2007 Scheubner

FOREIGN PATENT DOCUMENTS

EP 0398635 A2 11/1990

* cited by examiner

*Primary Examiner* — Patricia Nordmeyer

(74) *Attorney, Agent, or Firm* — Chernoff, Vilhauer, McClung & Stenzel LLP

(57) ABSTRACT

A security label (310) comprises a first layer (114) of a non-affixing polymeric coating printed on a coating receiving surface (362) of a carrier film substrate (112). Affixing portions (121) of a second layer (118) adhere to the carrier film substrate (112) via affixing regions (116) defined by the first layer (114). The first layer (14) is less adherable to the carrier film substrate (12) than the second layer (18), so that, in use, when the carrier film substrate (12) is removed from the first layer (14), the affixing portions (121) of the second layer (18) remain adhered to the carrier film substrate (12) and are disassociated from an adhesive material layer (120), and those portions of the second layer which are not affixing portions remain associated with the adhesive material layer (120) and are disassociated from the carrier film substrate (112).

12 Claims, 6 Drawing Sheets

SECURITY ARRANGEMENT

This invention relates to security arrangements. More particularly, but not exclusively, this invention relates to multi-coloured security arrangements, for example labels and tapes.

There are many circumstances when it is desired to ensure that documents have not been tampered with. Known security products for this purpose comprise a carrier paper which is coated with a suitable monochrome coloured coating layer. The monochrome coating has regions of high and low adherence to the document, so that if it is attempted to remove the regions of high adherence which remain behind on the document. These regions of high adherence can be in the form of letters spelling out, for example, the words VOID or INVALID to provide evidence of tampering.

Conventionally, a number of different printing processes are used in the manufacture of security labels, as described below:

- Rotary letterpress: A method of printing from raised surfaces, either metal type or plates whose surfaces have been etched away from image areas. Also called block printing. The printing press passes the substrate between two rotating cylinders when making an impression.
- Rotary flexographic: A printing method in which a liquid ink is applied to a raised photopolymer or rubber plate (stereo) in contact with an inking (anilox) roller. The plate rotates and transfers the image to the surface of the substrate.
- Rotary screen printing: A method of printing by using a squeegee to force ink through an assembly of mesh fabric and a stencil.
- Rotary gravure (rotogravure): A method of transferring images to paper from an intaglio (recessed) surface, as from an etching or engraving; sheet-fed gravure prints on individual sheets; rotary gravure prints onto a web or roll of paper.

Conventionally, inks can include additives to improve the printing processes, as described below:

- Flow additive: For correcting certain ink surface problems such as bubbles, voids or pinholes.
- Photo initiator: An agent which when exposed to a specific wavelength of energy forms a reactive element which starts the chain reaction to cause polymer formation (polymerisation). Most commercial photo-initiators for radical curing reactions contain benzoil groups, which are mainly responsible for the absorption of energy from UV light.

In the field of applying coatings such as ink to substrates such as plastics materials, it is known that such substrates present a number of problems. Important concepts in the understanding of these problems are the concepts of surface energy, surface tension and wetting tension. All of the following terms are used in the polymer films industry to represent the relative receptivity of a substrate film surface to the addition of inks, coatings, adhesives and extruded polymers:

- Surface energy is a surface characteristic of a solid substrate surface associated with the molecular forces of its interaction with another material. Surface energy cannot be measured directly, so is deduced by measuring one of two substitute properties: wetting tension or contact angle. Both of these measurements involve observing the behaviour of liquids placed on the substrate surface.
- Surface tension is a surface characteristic of a liquid resulting from the forces of attraction between molecules making up a liquid. For example, in atmospheric air, a drop of water will bead up on some substrate surfaces, but spread out (or wet out) to form a film on other substrate surfaces, depending on the relative values of the liquid surface tension and the substrate surface wetting tension. If the substrate surface has molecular forces (surface energy) high enough to overcome the liquid surface tension, then a liquid film will form.
- Wetting tension is the maximum liquid surface tension that will spread, rather than bead up (reticulate), on a substrate surface. It is a measurable property that is related to a substrate's surface energy. ASTM D 2578 is a procedure for determining wetting tension by applying different test solutions of increasing surface tensions until one is found that just spreads (wets) a substrate surface. Units of wetting tension (and surface tension) are dynes/cm, which are equivalent to mN/m.
- Treatment level refers to "how much" or "how well" the polymer film surface was treated in the film-making process. It is most commonly quantified with a wetting tension value in units of dynes/cm, and is often referred to as the "dyne level."
- Dyne level: The dyne per centimeter is the unit traditionally associated with measuring surface tension. In physics, the dyne is a unit of force specified in the centimeter-gram-second (CGS) system of units, a predecessor of the modern SI. One dyne is equal to exactly 10 μN (micronewtons). Equivalently, the dyne is defined as "the force required to accelerate a mass of one gram at a rate of one centimeter per second squared":

The introduction of plastic label films more than 40 years ago required surface treatment systems that would run at normal production speeds. In general, plastic films have chemically inert and nonporous surfaces with low surface energy, causing them to be non or relatively poor bonding to inks, coatings, and adhesives.

Surface treatments are used to improve the bonding of virtually all plastics films. Untreated (raw) polymer films, specifically polypropylene, polyethylene and polyester films, have low surface energy and conventionally are subjected to pre coating surface treatments to improve bonding between a coating such as ink and the film substrate. Conventionally, the methods used rely on combinations of chemical activation, surface roughening, and surface cleaning. The following list outlines the methods employed to improve bonding of inks and coatings to polymer film substrates:

- Acid etching/chemical treatment of a film substrate involves cleaning, etching, and rinsing steps. The cleaning removes any surface contaminants. The etching involves the use of acid or oxidizing agents, such as nitric acid ($NHO_3$) or potassium chromate ($K_2Cr_2O_7$), to change the substrate polymer surface chemically. Finally, the film substrate is rinsed clean of the etching chemicals and dried. This process is usually done following film manufacturing, significantly adding to the final cost of the film substrate.
- Priming is often done in conjunction with corona treatment to increase surface energy and improve adhesion of a coating, ink, or adhesive. The film substrate is corona treated to increase the surface energy enough to provide good adhesion for the primer coating. A primer is chosen that will provide a high surface energy for good adhesion to the film substrate. Some primers bond chemically to the substrate. An example would be polyethyleneimine, which is a cationic chemical and bonds strongly with treated film substrate surfaces, inks, and coatings that are anionic.
- Flame treatment exposes a moving film substrate surface to a gas-fired flame at a high enough temperature to create plasma. The plasma reacts chemically with the film substrate surface, which adds polar functional groups and increases surface energy.

Corona discharge converts the substrate surface from a nonpolar to a polar state. Ozone is generated during the process. It consists of a high-voltage electrical discharge across a fixed air gap between an electrode and a dielectric, usually a roller for web treatment applications. This discharge forms a corona in the gap between the electrode and the dielectric roller, thus treating the film substrate surface facing towards the electrode. Corona treatment is often done during film manufacturing and again in-line with a secondary converting process such as printing to increase the film substrate surface energy wetting tension, often by 10 dyne/cm and more.

Atmospheric plasma is similar to corona treatment. Like corona, plasma is the electrical ionization of a gas. In contrast, the plasma (glow) discharge creates a smooth cloud of ionized gas with no visible electrical filaments.

Conventionally, polymer film substrates are formed by the cast film process or by the blown film extrusion process, as described below:

Cast polymer film production: In the cast film process, molten polymer is usually extruded through a slot die onto an internally cooled chill roll and then passes through a series of rollers which will determine the nature and properties of the cast film including thickness. The cast film is then cut as required by saws, shears or hot wire methods.

Blown polymer film production: Blown-film extrusion is a process for forming plastic films. Blown-film extrusion involves a molten resin extruded through a circular die and filling the tube with air. The air within the tube stretches the film to obtain the desired thickness.

The generic or common term usually used to describe the type of security label within this patent is a VOID, VOIDING or DESTRUCT label. The label includes a latent message, which, in an applied undisturbed condition, is not visible. The label will 'destruct' or 'VOID' upon when the removal of the carrier film substrate from the final application surface, revealing the message.

Conventionally, the manufacture of security labels whether printed, metallic foiled or holographic based (HRI or foil embossed) requires the carrier film substrate to be treated to improve adhesion of any applied coating or ink upon the carrier film substrate. The conventional approach to applying coatings to polymer film substrates includes pre treatment of the polymer film substrate before coating, as described above, to increase the surface energy of the polymer film substrate. This results in a number of problems. The additional treatment steps result in increased complexity and cost, and greater potential for production defects to occur.

A further problem which occurs with conventional void security labels is that the pre coating treatment of the film substrate results in a "ghosting effect" in which the latent message is visible in the applied undisturbed condition before the label has been opened. The ghosting occurs when a silicone based coating or ink is used as the means of a first (release) layer and conventional filmic ink (inks designed to be printed and bond to polymer films) is printed as the second pigmented affixing layer to treated films. The eventual resultant 'ghosting' of the release area is caused by the greater level of 'wet-out' on the film surface caused by the relatively high silicone content of the first layer.

According to one aspect of this invention there is provided a security arrangement for application to a support, the security arrangement comprising a carrier, a first layer of a first material on the carrier, the first layer defining an affixing region substantially devoid of said first material, and a second layer of a second material on the first layer, wherein an affixing portion of the second layer adheres to the carrier via said affixing region.

According to another aspect of this invention, there is provided a method of forming a security arrangement for application to a support, said method comprising providing a carrier, providing a first layer of a first material on the carrier, the first layer defining an affixing region substantially devoid of said first material, and providing a second layer of a second material on the first layer, wherein an affixing portion of the second layer adheres to the carrier via said affixing region.

Preferably, the carrier comprises a substrate.

The first layer may be less adherable to the carrier than the second layer. When the substrate is removed from the carrier, the affixing portion of the second layer may remain adhered to the carrier.

Preferably the first layer is substantially inadherable to the carrier. The second layer may have a degree of adherability to the carrier which is greater than its degree of adherability to the support.

The carrier may be formed of a film material. The carrier may comprise a plastics material. The plastics material may comprise a polyester. The carrier may of course comprise any other suitable polymeric material, or paper. The carrier may be formed of a light transmitting material, and may be transparent or translucent.

According to yet another aspect of the present invention, there is provided a security label which comprises: a carrier film substrate which is formed of a plastics material; a first layer of a non-affixing polymeric coating printed on a coating receiving surface of the carrier film substrate, the non affixing polymeric coating being only relatively weakly adherable to the carrier film substrate, the first layer defining affixing regions providing a first pattern, said affixing regions being substantially devoid of the non-affixing polymeric coating; a second layer of an affixing material comprising one or more affixing polymeric coatings to provide a second pattern on the label, wherein affixing portions of the second layer adhere to the carrier film substrate via the affixing regions defined by the first layer; the security label further comprising a layer of an adhesive material to adhere the label to a support; wherein the carrier film substrate is not subjected to a surface energy raising pre-treatment before coating, such pre-treatment including acid etching, chemical treatment, priming, flame treatment, corona discharge and atmospheric plasma treatment, the coating receiving surface having a wetting tension of between 30 and 40 dynes/cm, the first layer being less adherable to the carrier film substrate than the second layer, so that, in use, when the carrier film substrate is removed from the first layer, the affixing portions of the second layer remain adhered to the carrier film and are disassociated from the adhesive material layer, and those portions of the second layer which are not affixing portions remain associated with the adhesive material layer and are disassociated from the carrier film substrate.

According to still yet another aspect of the present invention, there is provided a method of forming a security label, the method including: providing a carrier film substrate which is formed of a plastics material; printing a first layer of a non-affixing polymeric coating on a coating receiving surface of the carrier film substrate, the non affixing polymeric coating being only relatively weakly adherable to the carrier film substrate, the first layer defining affixing regions providing a first pattern, said affixing regions being substantially devoid of the non-affixing polymeric coating; providing a second layer of an affixing material comprising one or more affixing pigmented polymeric coatings to provide a second pattern on the label, wherein affixing portions of the second layer adhere to the carrier film substrate via the affixing regions defined by the first layer; providing a layer of an adhesive material to adhere the label to a support; wherein the carrier film substrate is not subjected to a surface energy raising pre-treatment before coating, such pre-treatment including acid etching, chemical treatment, priming, flame treatment, corona discharge and atmospheric plasma treatment, the coating receiving surface having a wetting tension of between 30 and 40 dynes/cm, the first layer being less adherable to the carrier film substrate than the second layer, so that, in use, when the carrier film substrate is removed from the first layer, the affixing portions of the second layer remain adhered to the carrier film and are disassociated from the adhesive material layer, and those portions of the second layer which are not affixing portions remain associated with the adhesive material layer and are disassociated from the carrier film substrate.

The carrier may be a film of a material having a thickness of less than 0.2 mm, preferably less than 100 microns more preferably in the range of substantially 25 microns to substantially 50 microns.

The first layer may be formed of a light transmissive material, and may be transparent or translucent. Preferably, the first layer is clear. Said first layer may comprise a non-filmic or non-affixing material. A non-filmic or a non-affixing material may be described as a material which does not adhere to the carrier, which may be a film of a polymeric material, for example a polyester film. The first layer may be formed of a material which comprises a non-affixing polymer coating.

A suitable first material for use as the first layer may be a non-affixing ink, which may comprise a UV rotary letter press ink, preferably comprising a short chain polymeric substance, which may have a two-dimensional structure. The first material may comprise a polymeric coating with a short chain molecular structure. In some embodiments, the first material may be pigmented. In other embodiments, the first material may comprise a varnish.

The affixing region of the first layer may have the shape of a letter. In the preferred embodiment, the first layer may comprise a plurality of said affixing regions. Different affixing regions may have the shape of different letters, whereby words can be formed from said letters, such as VOID, OPENED, INVALID or the like. The words preferably provide evidence of the arrangement having been tampered with. Thus, in the preferred embodiment, when the carrier is removed from the support, the affixing portions of the second material remaining adhered to the carrier form words, for example, VOID, OPENED, INVALID or the like, which provide evidence of tampering with the arrangement. Corresponding gaps maybe formed from said affixing portion in the first and said second layers remaining on the support. Thus, in one embodiment, after the carrier has been removed, the support has thereon, the first and second layers, having gaps which spell out the words, for example as indicated above.

Preferably, the first layer is substantially colourless.

The second layer may be formed of a pigmented material. Preferably, the second layer is formed of a plurality of pigmented materials. Said plurality of pigmented materials may comprise a plurality of colours. The second layer may be provided on the first layer in the form of desired patterns, words and/or colours.

The second layer may comprise an affixing material. An affixing material may be described as a material which can adhere to the substrate which may be a film of a polymeric material, for example a polyester film.

The second layer is conveniently formed of a plurality of pigmented polymer coatings, to allow printed matter in a desired pattern to be applied to the first layer as the second layer.

The second material may comprise a UV rotary letter press ink. The second material preferably comprises a long chain polymeric substance, which may have a three-dimensional lattice structure. The second material may comprise a pigmented polymeric coating with a long chain polymeric structure.

The security arrangement may further comprise a release layer. In a first embodiment, the release layer may be applied to the second layer. The release layer may comprise a liner, which may include an adhesive resistant material, for example a non-stick material, such as a silica compound. In the first embodiment, an adhesive may be provided on the release layer. The adhesive is preferably coated thereon and can be transferred to the second layer.

A sealing layer may be provided between the second layer and the adhesive to prevent movement of the adhesive into the second layer. The sealing layer may be a clear polymer for example a matt clear polymer.

In a second embodiment, the sealing layer may be omitted. In the second embodiment an adhesive material may be applied to the second layer to provide an adhesive layer. The adhesive material may be a hot melt adhesive. The adhesive material may be curable by light, such as UV light.

In the second embodiment, the release layer may be applied to the adhesive layer.

In the second embodiment, the first layer may be a polymeric material. The first layer may comprise a transparent ink.

In one version of the second embodiment, a pattern layer may be applied to the second layer. The adhesive material may be applied over the pattern layer. The pattern layer may comprise a metallised material. The pattern layer may be formed of different colours, letters, numbers and/or the like.

The security arrangement may further include a removal layer to allow the carrier to be removed from the support. The removal layer may be provided on a removal region of the second layer, for example an edge or end region of the second layer. The removal layer may comprise a silica compound, for example a silica varnish.

The second layer may comprise a confuse pattern region to render unreadable any matter printed on the substrate. The confuse pattern region may comprise an alpha-numeric pattern. The confuse pattern region may comprise other types of characters, random marking or shading.

An identification layer may be provided for identification purposes.

The identification layer may include an activatable material which may define an identification pattern. The activatable material may be material activatable by ultra-violet light.

Possibly, the surface energy of the carrier film substrate is reduced before coating.

Possibly, the proportion of silicone in the first layer is less than the proportion of silicone in the second layer.

Possibly, the carrier film substrate plastics material comprises a polyester, a polypropylene or a polyethylene.

Possibly, the carrier film substrate is transparent or translucent. Possibly, the first layer is clear. Possibly, the first pattern is not visible until the carrier film substrate is removed from the first layer.

Possibly, the non-affixing polymeric coating of the first layer comprises a short chain polymeric substance, which may have a two-dimensional structure.

Possibly, the affixing material of the second layer comprises a long chain polymeric substance, which may have a three-dimensional lattice structure.

Possibly, the layer of adhesive material is applied directly to the second layer, and may comprise a hot melt adhesive.

Possibly, the second layer includes a plurality of affixing polymeric coatings, each successive coating layer having an increased proportion of silicone relative to the previously applied coating layer.

Possibly, after application of the first layer and/or the or each coating of the second layer, the substrate is cured and cooled, and may be simultaneously cured and cooled.

According to a yet further aspect of the present invention, there is provided printing apparatus for forming a security label, the apparatus including a printing station for applying an ink or coating to a substrate.

Possibly, the apparatus includes a surface energy reducer for reducing the surface energy of the substrate prior to applying the ink or coating at the printing station. The surface energy reducer may comprise an electrical discharger.

Possibly, the printing station includes a print applicator through which the substrate passes, a curing device and a cooler, the curing device and the cooler being located so that the substrate is cured and cooled after passing through the print applicator. Possibly, the curing device and the cooler are located so that the substrate is simultaneously cured and cooled after passing through the print applicator. The cooler may comprise a chill roller, which may be chilled by a refrigerator.

Possibly, the printing station includes a print applicator through which the substrate passes and a curing device, the curing device being spaced from the print applicator by a clear distance no greater than 200 mm.

Possibly, the printing station includes a print applicator through which the substrate passes and a curing device, the speed of travel of the substrate between the print applicator and the curing device being at least 15 m/minute.

Possibly, the print applicator includes a print cylinder, and may include an impression cylinder.

Possibly, the substrate moves across the clear distance between the print applicator and the curing device in less than 0.8 seconds.

Possibly, the printing station includes a curing device, the curing device including a UV light source, which may have a power rating of at least 5 KVA.

Possibly, the security label is a void, voiding or destruct type of security label.

Embodiments of the invention will now be described by way of example only, with reference to the accompanying drawings, in which.

Figure 1:
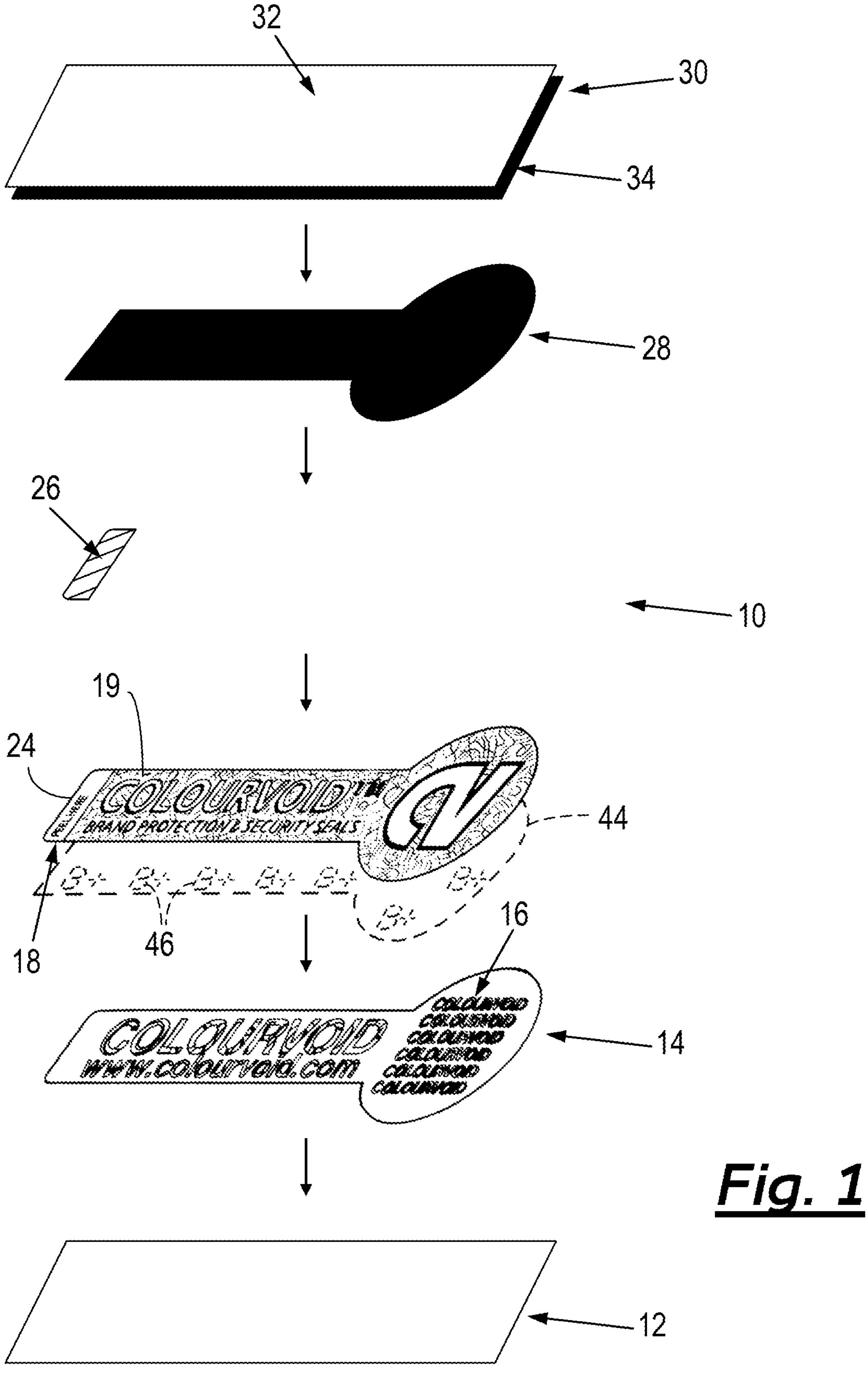
FIG. 1 is an exploded view of the layers of the security arrangement.

Referring to the drawings, a security arrangement in the form of a security label 10 is shown in FIG. 1 in which the layers are shown separated from each other for clarity. The security label 10 comprises a carrier in the form of a substrate formed of a film 12 of a polyester material which is substantially 50 microns thick.

A first layer 14 of a non-affixing material such as a polymeric coating is printed onto the film 12 by suitable printing means, by example by narrow web rotary letter press UV printing. The first layer 14 is provided with affixing regions 16 which are apertures in the first layer 14. The affixing regions 16 are shaped in the form of letters to spell appropriate words, e.g. VOID, OPENED, or, in the example shown COLOUR-VOID. The affixing regions 16 are substantially devoid of the non-affixing material. The non-affixing material is a polymer coating which will not adhere to the substrate 12, and may be a UV rotary letter press ink having short chain two dimensional polymeric molecules.

A second layer 18 formed of an affixing material comprising a plurality of affixing pigmented polymer coatings applied onto the first layer 14.

An affixing pigmented polymer coating is a polymer coating which will adhere to film material such as the substrate 12, and may be a UV rotary letter press ink containing three-dimensional long chain polymeric molecules, providing a latticed molecular structure.

The second layer 18 is applied onto the first layer 14 using the same process as the application of the non-affixing material onto the substrate 12, and may have a patterned region 19. The patterned region 19 may be any desired pattern, for example in the form of a picture or the like, formed of any desired colours using appropriately coloured pigmented polymeric coatings as would be appreciated by the person skilled in the art.

The second layer 18 adheres to the film 12 via the affixing regions 16 in the first layer 14. The affixing regions 16 are represented with a pattern, to demonstrate the appearance of the affixing regions after having been peeled away from the rest of the label 10 when it is adhered to a suitable support (see below).

Figure 2:
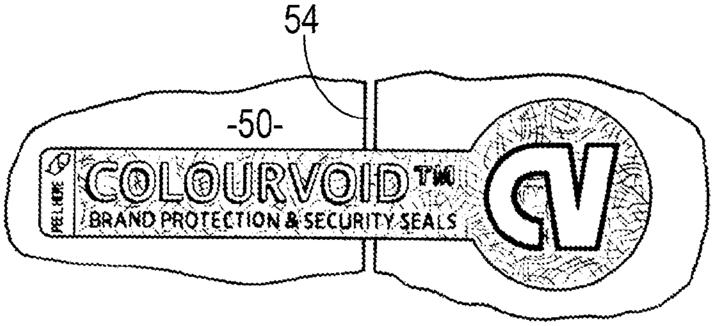
FIG. 2 is a top plan view of a security arrangement shown in FIG. 1.

An example of a suitable pattern is shown in FIG. 2, in which, the patterned region 19 comprises a decorative coloured pattern. Such labels as shown in FIG. 2 could be used, for example, when it is desired to provide tamper evident protection of boxes cartons, item closures, or the like.

In another embodiment, for example, for use in identity cards or passports the second layer could have a central region formed of a clear or colourless transparent ink with a decorative pattern around the edge. In this embodiment, the central region would be arranged over a photograph of the individual to be identified in the identity card or passport.

In a further embodiment, for example, as a security label used with documents to convey confidential information, the second layer 18 could comprise a central region formed of a confuse pattern and an edge region formed of a desired coloured pattern. In this embodiment, the confuse pattern is provided to obscure confidential information printed onto the film 12.

Adjacent the patterned region 19, the second layer 18 is also provided with an instruction region 24 including the words "peel back" to instruct the user as to the part of the label 10 from where to remove the substrate 12 as will be explained below.

A removal layer 26 may be applied over the instruction region 24. To prevent adhesive from being applied in said region to the film 12. The removal layer 26 can be a silicone varnish to which adhesive does not stick.

A sealing layer 28 is applied onto the second layer 18 to prevent adhesive from diffusing into the second layer 18. The sealing layer 18 may be a suitable ink seal.

Finally, a release layer 30 is applied to the label 10 over the second layer 18, with the sealing layer 28 arranged between the release layer 30 and the second layer 18. The release layer 30 comprises a backing sheet 32 and an adhesive 34 applied to one face of the backing sheet 32.

The sealing layer 28 is provided, as explained above, to prevent the adhesive on the backing layer diffusing into the second layer 18, thus allowing the release layer 30 to be removed from the rest of the label 10. The backing sheet 32 may be formed of a suitable silica liner material, so that the adhesive 34 has a greater degree of adherence to the second layer 18 and/or the sealing layer 28 so that the adhesive 34 remains on the second layer 18 and/or the sealing layer 28. This enables the label 10, after the backing sheet 32 has been removed, to be stuck onto a suitable support such as a paper or other suitable article, such as a box or a carton 50.

Figure 4:
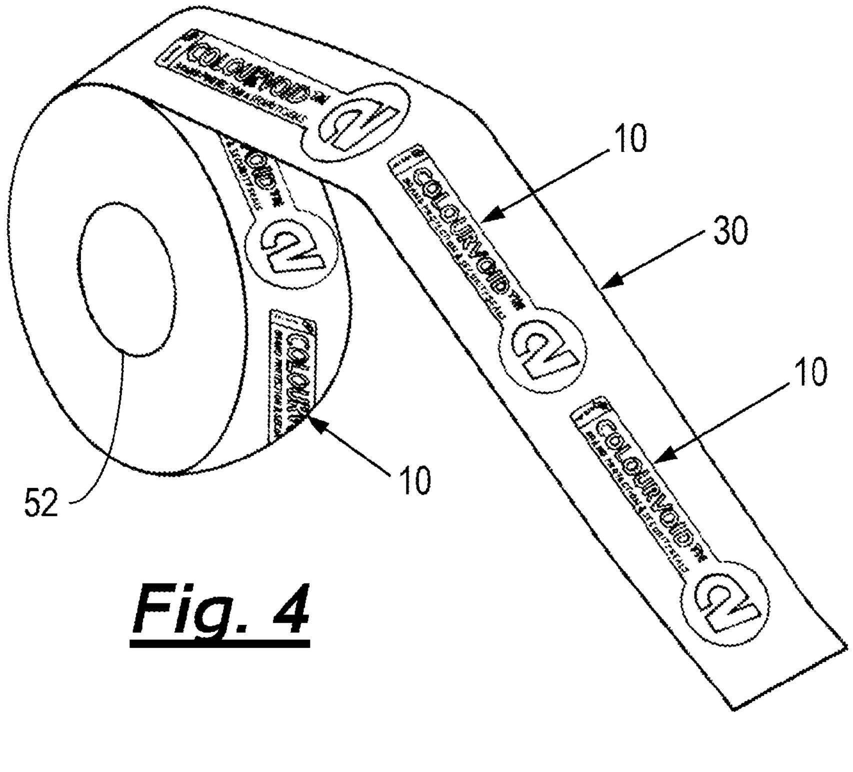
FIG. 4 is a view of a plurality of security arrangements on a release layer.

Referring to FIG. 4, a plurality of the labels 10 as described above are applied to a single release layer 30 which may be wound onto a reel 52 for transport. When it is desired to apply any of the labels to a suitable support, for example, the box or carton 50, one of the labels 10 is removed from the release layer 30 and applied to the box or carton 50. The adhesive 34 remains adhered to the label 10 enabling the label 10 to adhere to the box or carton 50. In use, the label 10 is applied across a gap 54 in the lid of the box or carton 50.

Figure 3:
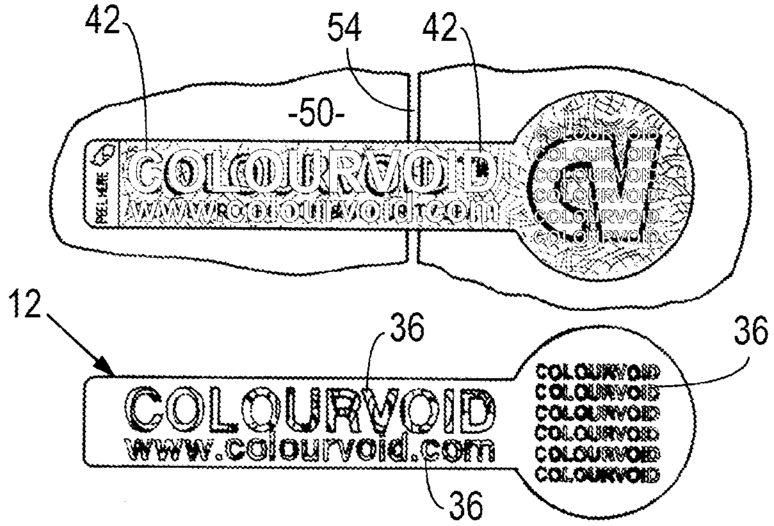
FIG. 3 is a top plan view of the security arrangement of FIG. 1 in which the substrate has been removed.

In use, with the embodiment shown in FIGS. 2 and 3, the person in receipt of the box or carton 50 can immediately tell whether the box or carton 50 has been tampered with. Anybody attempting to open the box or carton 50 would need to remove the label 10 applied thereto. This can only be done by peeling away the substrate 12. When this happens, portions 36 of the second layer 18 which are adhered to the substrate 12 via the affixing regions 16 remain so adhered, and are pulled away with the substrate 12 as it is peeled from the rest of the label 10 adhered to the box or carton 50. The substrate 12, as shown in FIG. 3 carries with it the portions 36 of the second layer as can be seen.

As can be seen from FIG. 3, the word COLOURVOID becomes immediately visible on the substrate 12 and as blank spaces 42 in the remainder of the label 10 on the box or carton 50. Thus, if the person receiving the box or carton 50 notices the word COLOURVOID, he or she will immediately realise that the box or carton 50 has been tampered with and should report it immediately to the company concerned.

There is thus described a security arrangement 10 which has the advantage that it provides a simple method of protecting information and providing evidence of tampering. It can be used in a variety of applications, for example, in addition to the use in providing tamper evident protection of boxes or cartons described above, it can be used in passports for attaching a photograph to the passport by providing a clear central region over the photograph. In addition, it can also be used on letters or other documents to protect confidential information.

Various modifications can be made without departing from the scope of the invention, for example, the sealing layer could be obviated or an identification layer 44 could be provided, for example as shown in broken lines in FIG. 1 over the second layer 14. The identification layer 44 could include a pattern 46 e.g. the letters B+, as shown. The pattern 46 is formed of a material sensitive to UV light which becomes visible when UV light is shone thereon. This would provide suitable identification to the person receiving an article with the label 10 thereon that the label 10 is genuine.

Figure 5:
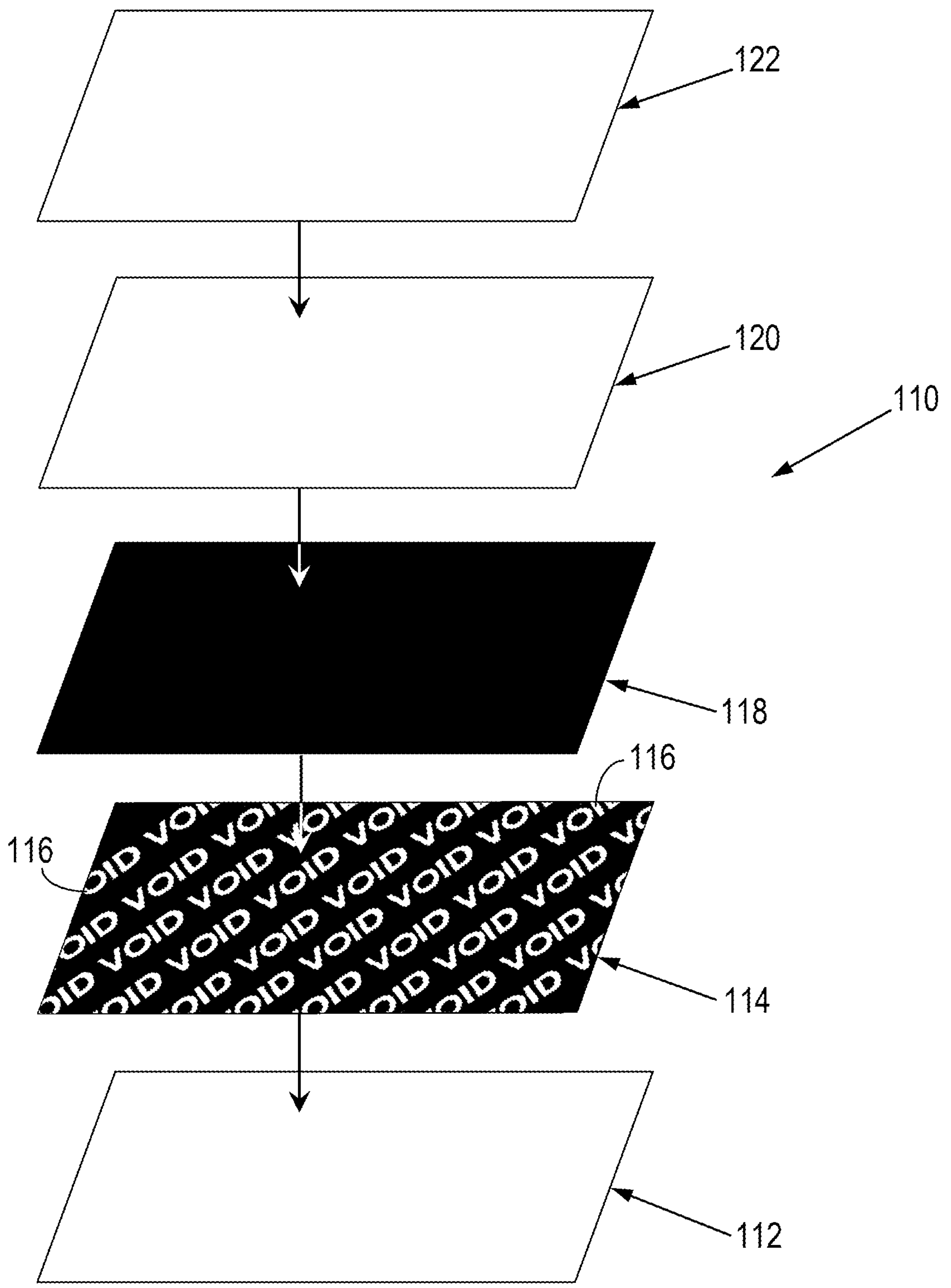
FIG. 5 is an exploded view of a further security arrangement.

A further embodiment of a security arrangement is shown in FIG. 5 and is in the form of a security label 110. The label 110 comprises a plurality of layers, which are shown separated from one another for clarity. The security label 110 comprises a carrier, in the form of a clear substrate of film 112 of a polyester material, which can be up to or about 75 microns thick.

A first layer 114 of a non-affixing material is printed onto the film 112. The first layer 114 may be a polymeric material, for example in the form of a transparent ink. The polymeric material may be a polymer coating which does not adhere to the film 112, such as a UV rotary letter press ink, which may be the same as or similar to the ink forming the first layer 14 of the embodiment shown in FIG. 1.

The first layer 114 shown in FIG. 5 has affixing regions 116, which are apertures or gaps in the first layer 114. The affixing regions 116 are shaped to spell out, in the embodiment in FIG. 5, the word VOID. Of course, it will be appreciated that the affixing regions 116 could be any other shape, e.g. spelling out different words or even simply in the form of a pattern.

A second layer 118 is applied onto the first layer 114. The second layer 118 is formed of an affixing material which can adhere to the material forming the film 112. A suitable such affixing material is a film e.g. transparent white ink, which may be a polymer coating, such as a UV rotary letter press ink containing three-dimensional long chain polymeric molecules. Alternatively, the second layer can be formed of a suitable varnish.

The second layer 118 adheres to the film 112 through the affixing regions 116 in the first layer 114.

A layer of an adhesive material 120 is then applied to the second layer 118. The adhesive material 120 may be a UV hot melt adhesive, which may be a prepolymer adhesive curable by UV light. It is believed that UV treatment of the adhesive causes cross-linking of the prepolymeric material to effect the aforesaid curing.

The label 110 can be applied to a liner 122 such that the adhesive material contacts the liner 122. The liner 122 may be a release liner formed of a siliconised material, such as a honey siliconised material.

The use of a sealing layer, similar to the sealing layer 28 is not required in the embodiment described above with reference to FIG. 5.

In use, a plurality of labels 110 are applied to a single release liner 122, and wound upon a reel, if desired. The labels 110 can be removed in turn and applied to a suitable support, in a similar way as described above with reference to FIGS. 2 to 4. The adhesive material 120 adheres the label 110 to the support. In the event that any tampering occurs to the support, it would be necessary for an attempt to be made to remove the label 110 therefrom, by peeling away the substrate or film 112. This will result in portions of the second layer 118 remaining adhered to the support, while other portions of the second layer 118 remain adhered to the substrate or film. These other portions were adhered to the substrate 112 through the affixing region 116 in the first layer 114 and are thus removed with the substrate 112 when it is peeled away. As a result, the word VOID appears on the support provides a warning that attempts have been made to tamper with it.

Figure 6:
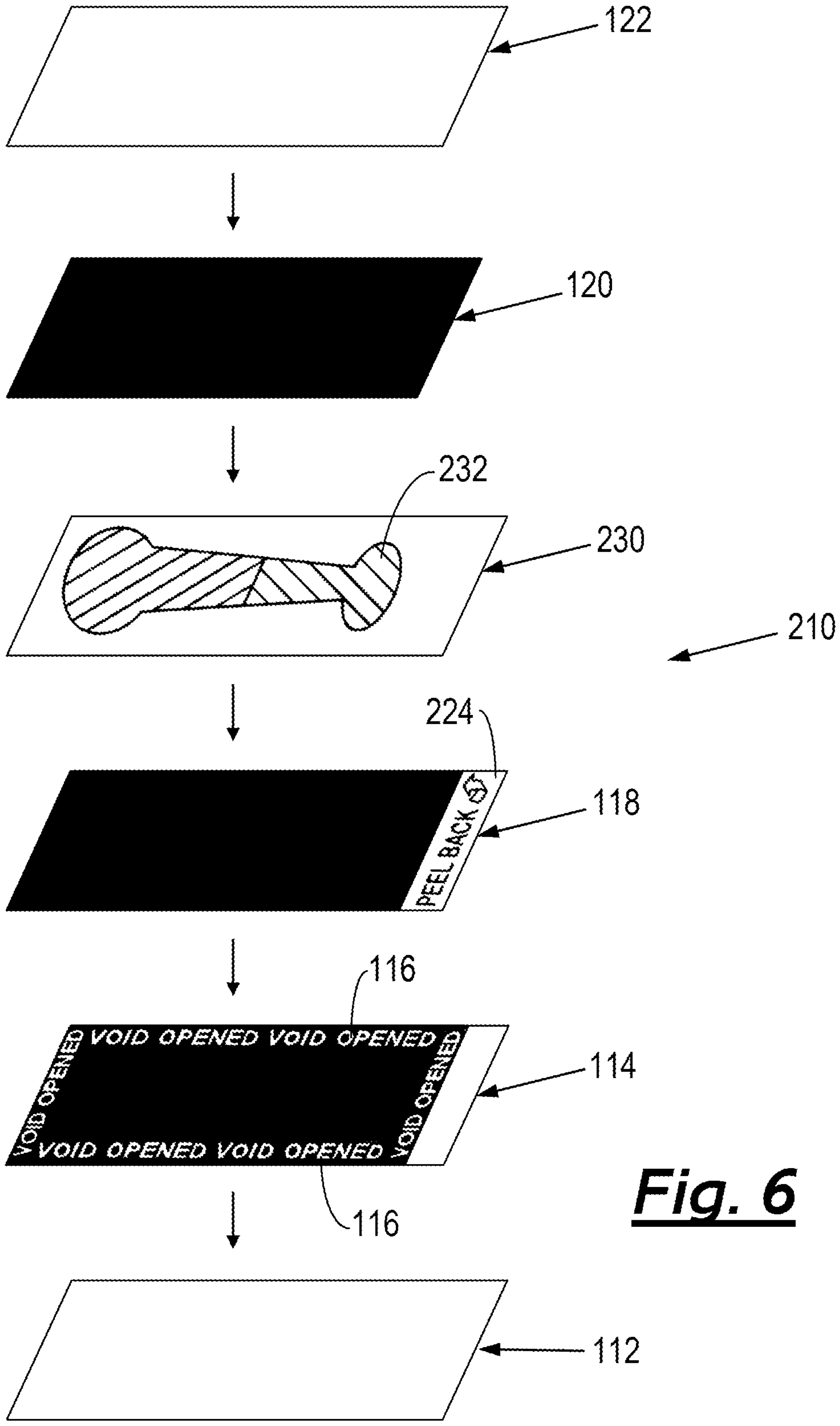
FIG. 6 is an exploded view of yet another security arrangement.

A further embodiment is shown in FIG. 6 and is in the form of yet another security label 210. The label 210 comprises a plurality of layers which are, again, shown separated from one another for clarity.

The security label 210 comprises many of the same features, as shown in FIG. 5 and these have been designated with the same reference numerals. The label 210 differs from the embodiment shown in FIG. 5 by the provision of a peel region 224, which is devoid of the adhesive material 120 and facilitates peeling away of the substrate 112, together with the portions of the second layer 118 adhering thereto through the affixing regions 116.

A further difference is that the label 210 comprises a pattern layer 230 applied to the second layer 118. The pattern layer 230 can comprise a metallised pattern 232 comprised of different colours, letters, numbers and/or the like. The pattern layer is formed using metallic inks, for example as disclosed in published international patent application no. WO 03/095217A1.

FIGS. 7 to 11 show another embodiment of the invention, many features of which are similar to those already described in relation to the embodiments of FIGS. 1 to 4, 5 and 6. Therefore, for the sake of brevity, the following embodiment will only be described in so far as it differs from the embodiments already described. Where features are the same or similar, the same reference numerals have been used as for the embodiments shown in FIGS. 5 and 6, and the features will not be described again.

Figure 10:
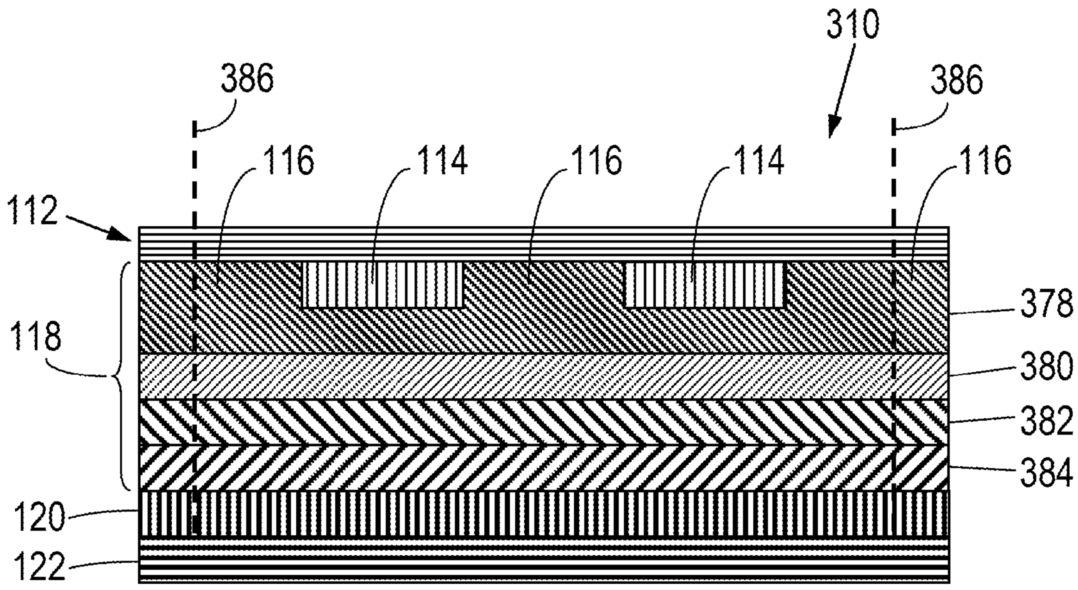
FIG. 10 is a schematic sectional side view of the security label of FIG. 9 at a later stage in the forming process, in an undisturbed condition before application.

FIGS. 7 to 10 show printing apparatus 358 for forming a security label 310 and steps in the production of the security label 310, the finished label 310 being shown in FIG. 10 mounted on a release liner or backing sheet 122.

The security label 310 includes a carrier film substrate 112 which comprises clear, semi hazy, translucent or semi translucent untreated polyester, polypropylene or polyethylene film. The substrate 112 could comprise untreated polyester, polypropylene or polyethylene films produced using either 'cast' or 'blown' manufacturing processes (q.v. above). The applicant has found that preferably the thickness of the substrate 112 should ideally be between 23 μm and 100 μm, and more preferably between 23 and 75 μm, and in one example, could optimally be approximately 50 μm.

The substrate 112 of untreated polyester, polypropylene or polyethylene will naturally carry low surface energy properties that are associated with untreated polymer films, having a wetting tension of between 30 and 40 dynes/cm on both an upper surface 360 and a lower, coating surface 362 of the substrate 112 when measured on the dyne scale. The coating surface 362 is the most critical surface as all inks and coatings are printed to this side.

Figure 7:
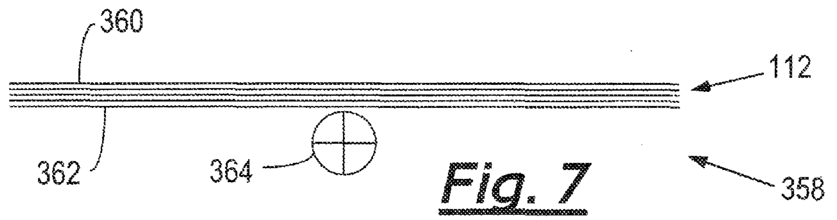
FIG. 7 is a schematic side view of part of a printing apparatus according to the invention, showing a step in the forming of a security label according to the invention.

As shown in FIG. 7, the printing apparatus 358 of the invention includes a surface energy reducer comprising an electrical discharger in the form of a discharge bar 364. The coating surface 362 (which will receive the printed indicia) must first pass over the discharge bar 364 to reduce or remove any remaining static charge prior to the printing process, thus reducing the surface energy of the coating surface 362. This is to ensure that the dyne level of the coating surface 362 is kept within the tolerance required.

Figure 8:
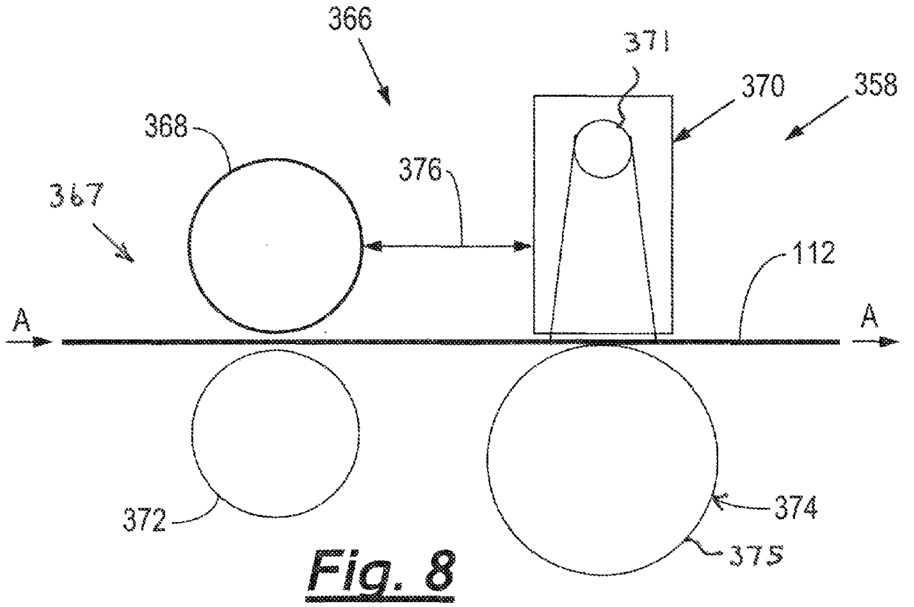
FIG. 8 is a schematic side view of another part of the printing apparatus of FIG. 7, showing another step in the forming of a security label according to the invention.
Figure 9:
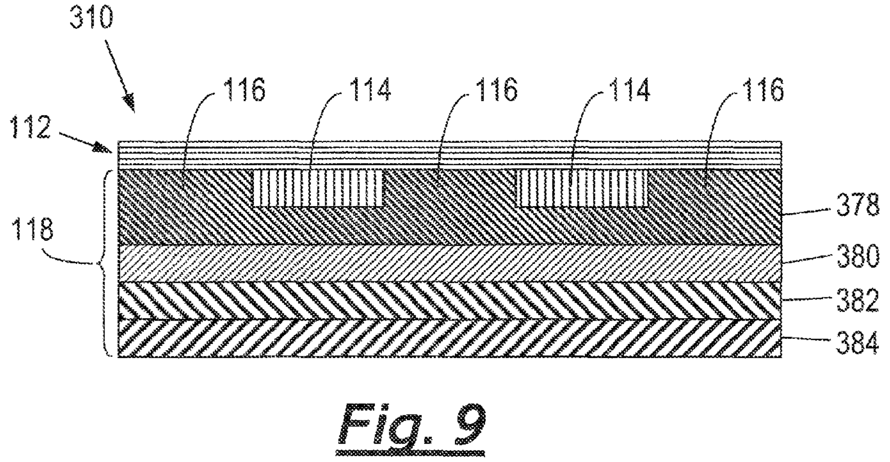
FIG. 9 is a schematic sectional side view of still another security label during the forming process.

As shown in simplified form in FIG. 8, the printing apparatus 358 includes one or more printing stations 366. Each printing station 366 comprises a print applicator 367 comprising a print cylinder 368 with a mounted printing plate and an impression cylinder 372. Each printing station 366 further comprises a curing device 370 including an ultra violet (UV) light source 371, and a cooler 374 including a chill roller 375 which is cooled by a refrigeration unit (not shown). The substrate 112 firstly passes between the print cylinder 368 and the impression cylinder 372, moving in a direction indicated by arrows A. The curing device 370 is spaced from the print cylinder 368 by a clear distance 376. The substrate 112 then passes simultaneously over the chill roller 375 and beneath the UV light from the UV light source 371. In one example, the UV light source 371 has a power rating of 5 KVA.

The applicant has found that, for successful bonding/coating of the materials of the invention, the time between application at the print cylinder 368 and UV curing should be minimised, and the curing rate should be maximised. Thus to meet these criteria, the distance 376 should be minimised, while the speed of travel of the substrate 112 is maximised. In one example, the speed of travel of the substrate 112 is at least 15 m/minute. In one example, the distance 376 is no greater than 200 mm. In one example, the time the substrate 112 moves across the clear distance 376 is less than 0.8 seconds. In one example, the UV light source 371 has a power rating of 5 KVA.

The close location of the cooler 374 and the curing device 370 provides the advantage that the high temperatures generated by the high curing rate are alleviated by the chill roller 375, which prevents melting of the substrate 112.

After passing over the discharge bar 364, the substrate 112 passes through a first printing station 366. The print cylinder 368 applies a clear/transparent first layer 114 comprising one or more short-chain polymer inks without pigment. The short chain polymer inks have a two dimensional structure which after rapid UV curing provides a stable but tenuous bond to the substrate 112.

The inks of the first layer 114 include a flow additive, a liquid silicone and a photo initiator (q.v. above) to ensure the correct surface/wetting tension is achieved (which for film formation must be less than the wetting tension of the substrate) and rapid curing between the ink and the substrate. UV light (at a minimum of 5 KVA output) could be used for the curing process to ensure as much cross linking of the polymeric ink as possible. Post curing, if it occurs, is beneficial to the process but does not markedly alter the finished performance of the product.

This coating must be cured as quickly as possible once leaving the printing roller. Line speed and the distance between the printing unit and the curing unit need to be specific for the process to work, as described above.

The inks of the first layer 112 could be applied via the following printing processes: rotary letterpress, rotary flexographic, rotary screen and rotary gravure printing processes (q.v. above).

The second layer 116 is then applied. The second layer 116 could comprise one or more pigmented coating layers. In the example shown, the second layer 116 comprises four differently pigmented layers 378, 380, 382, 384, each of which is pigmented with one of cyan, magenta, yellow or black pigment in accordance with CMYK printing.

Each of the second layer pigmented coating layers 378, 380, 382, 384 is applied at a printing station 366 after the substrate 112 has passed over an electrical discharger in the form of a bar 364. Each of the second layer pigmented coating layers 378, 380, 382, 384 comprises one or more long chain polymer inks having a three dimensional structure, which after UV curing provides a relatively stable and strong bond to the substrate 112 or previous coatings on the substrate 112.

The inks of the second layer 118 include a flow additive, a liquid silicone and a photo initiator (q.v. above) to ensure the correct surface/wetting tension is achieved (which for film formation must be less than the wetting tension of previously applied coating or the substrate). Letterpress, lithographic, gravure or flexographic printing technologies could be used to apply these inks, which must be UV cured as quickly as possible once leaving the print cylinder 368. UV light (at a minimum of 5 KVA output) is used for the curing process to ensure as much cross linking of the polymeric ink as possible. Post curing, if it occurs is beneficial to the process but does not markedly alter the finished performance of the product.

For the first applied layer 378 of the second layer, in one example, it is preferential to use an 80% halftone image, rather than a solid image for this layer. For subsequent layers 380, 382, 384, it is preferential but not essential to use a solid image.

Each successively applied coating must have a lower wetting tension than the previously applied layer, coating or the substrate for film formation, and the applicant has found that the wetting tension can be altered by careful control of the silicone content of the coating. By increasing the proportion of silicone in the coating, the wetting tension is reduced. Thus, each successively applied coating has an increased level of silicone relative to the previously applied coating.

A layer of adhesive 120 is then direct coated to the final pigmented layer 384 of the second layer 118. The adhesive is a UV pre-polymer hot-melt adhesive, which is applied via an in-line hot melt slot die (not shown) Direct coating means the adhesive is coated directly onto the surface of the final pigmented layer 384 and not transfer coated from any other carrier medium. Direct coating provides a stronger bond, in contrast with transfer coating, which does not provide the bonding characteristics required in the finished label which will permit 'shearing' within the layers of the label and provide the void or destruct feature desired. The adhesive must be a high tack adhesive and offer a high re-melt point for additional security. The coat weight of the adhesive can be variable, depending on the label's specification, but is between 15 and 40 gsm.

A silicone coated release liner or backing sheet 122 is then brought into contact with the adhesive layer 120. The release liner 122 is the main support for the finished die-cut labels and can comprise a silicone coated paper or synthetic material of sufficient strength and dimensional stability that deems it fit for purpose.

Die-cutting then takes place to form lines of weakness such as perforations or cut lines 386 through the carrier film substrate 112, the first and second layers 114, 118 and the adhesive layer 120, but not the liner 122, and final finishing takes place to create self-adhesive or pressure sensitive labels 310 on rolls or sheets, as shown in FIG. 10. FIG. 10 shows the security label 310 of the invention in an undisturbed condition on the liner 122.

Figure 11:
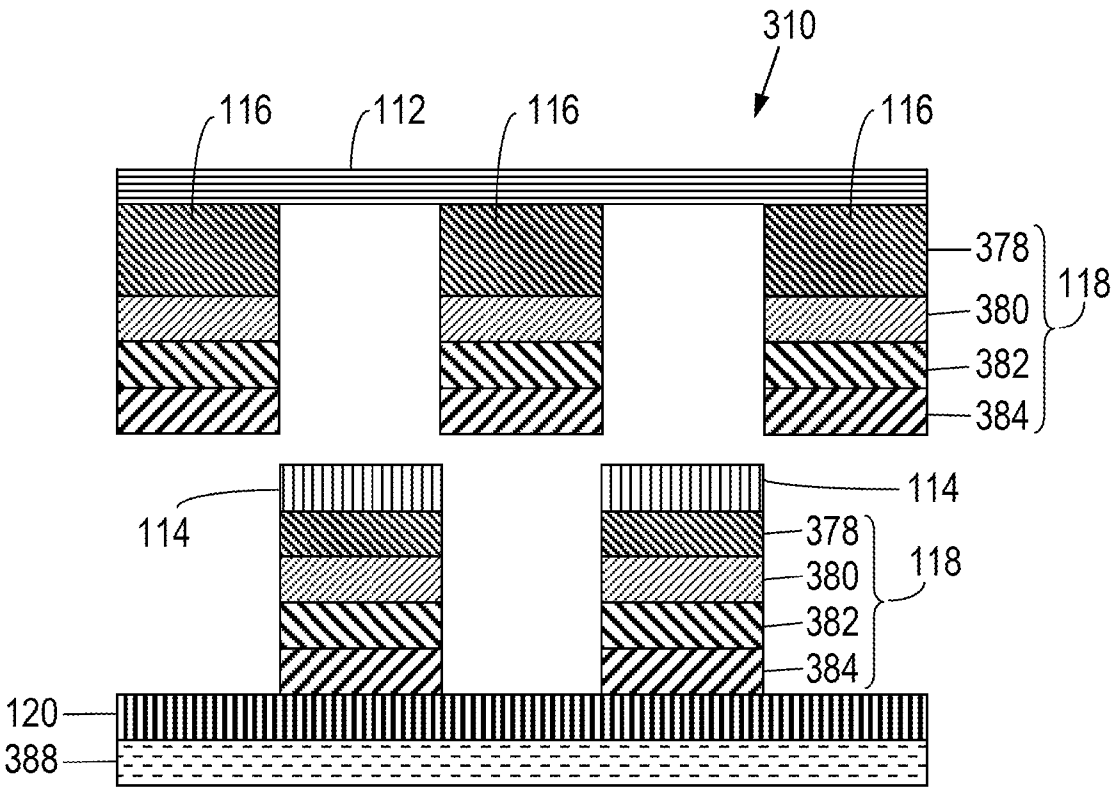
FIG. 11 is a schematic sectional side view of the security label of FIGS. 9 and 10 in use, after application to an article, in which part of the label has been removed.

FIG. 11 shows a label 310 in use. The release liner 122 has been removed and the label 310 applied to an article surface 388, for example, a security closure on a paperboard carton. Initially, the label 310 is in an applied, undisturbed condition. The carrier substrate film 112 has then been removed, causing disassociation of parts of the label 310 in a controlled and predetermined manner.

The relatively weakly adhering first layer 114 disassociates from the carrier film substrate 112, while the more strongly adhering second layer 118 in the affixing regions 116 remains associated with the carrier film substrate 112. Simultaneously, the pigmented coating layers 378, 380, 382, 384 shear, so that the second layer 118 in the affixing regions 116 disassociates from the adhesive layer 120, but the second layer 118 other than in the affixing regions 116 remains associated with the adhesive layer 120. This occurs because the bond between the second layer 118 and the carrier film substrate 112 is stronger than the bond between the second layer 118 and the adhesive layer 120, because of the increasing silicone content of the successive layers of the second layer 118.

As in previous embodiments, the affixing regions 116 could provide a pattern, which, because the first layer 114 is transparent, is latent, ie only becomes visible when the carrier film substrate 112 is removed from the article to which the label 310 has been applied. On removal, the latent pattern becomes visible both on the removed part and the still applied part. Any attempt to re-assemble the label will be apparent since in a cold state the hot melt adhesive will not bond to the removed part, and the shearing of the second layer causes damage to the coating layers, so that they cannot readily be reassembled to the undisturbed condition.

Advantageously, the applicant has surprisingly found that, because of the relatively low silicone levels of the first layer 114 and the first pigmented coating 378 of the second layer 118, the labels of the invention are substantially free of the ghosting of the latent pattern characteristic of labels produced by pre-treatment having a first layer with a relatively high silicone content. The invention thus provides a better quality product than has conventionally been available.

Furthermore, it should be particularly noted that the method of manufacture of the invention involves no pre treatment of the coating surface of the plastics substrate before printing. There is no acid etching or chemical treatment, no priming, no flame treatment, no corona discharge, and no atmospheric plasma treatment, and in fact any such pre treatments would render the process of the invention unworkable. The absence of pre treatment reduces the cost, complexity and defect rate of the process, and improves the product quality. In fact, in contrast to conventional printing/coating processes which pre-treat the surface to be coated to raise the surface energy, the process of the invention includes a surface energy reducer to reduce the surface energy of the surface to be coated. The absence of pre-treatment of the carrier film substrate is apparent in the finished label 310, as the dyne level of the exposed carrier film substrate can be easily measured.

Various other modifications could be made without departing from the scope of the invention.

Any suitable curing device could be used. In principle, the means to print the indicia inks and coatings is not limited to UV curing, it is also possible to use water-based inks and coatings with associated curing processes (hot air, RF or radio frequency and infra red) as well as solvent based inks and coatings with their relevant curing processes, although this is the least favoured method due to the environmental impact and cost of this process.

The label of the invention could include any suitable number of layers, which could be clear, transparent, partially transparent, opaque, partially opaque, pigmented, partially pigmented or non pigmented as required.

Although the term "label" has been used in this document, this term encompasses security closures, labels and tapes of any suitable size without restriction.

Any of the features or steps of any of the embodiments shown or described could be combined in any suitable way, within the scope of the overall disclosure of this document.

There is thus provided a security label which is easier to manufacture and of better quality than conventional security labels.

The invention claimed is:

1. A security label comprising: a carrier film substrate which is formed of a plastics material; a first layer of a non-affixing polymeric coating printed on a coating receiving surface of the carrier film substrate, the non affixing polymeric coating being only relatively weakly adherable to the carrier film substrate, the first layer defining affixing regions providing a first pattern, said affixing regions being substantially devoid of the non-affixing polymeric coating; a second layer of an affixing material comprising one or more affixing polymeric coatings to provide a second pattern on the label, wherein affixing portions of the second layer adhere to the carrier film substrate via the affixing regions defined by the first layer; the security label further comprising a layer of an adhesive material to adhere the label to a support; wherein the carrier film substrate is not subjected to a surface energy raising pre-treatment before coating, such pre-treatment including acid etching, chemical treatment, priming, flame treatment, corona discharge and atmospheric plasma treatment, the coating receiving surface having a wetting tension of between 30 and 40 dynes/cm, the first layer being less adherable to the carrier film substrate than the second layer, so that, in use, when the carrier film substrate is removed from the first layer, the affixing portions of the second layer remain adhered to the carrier film and are disassociated from the adhesive material layer, and those portions of the second layer which are not affixing portions remain associated with the adhesive material layer and are disassociated from the carrier film substrate.

2. A security label according to claim 1, wherein the surface energy of the carrier film substrate is reduced by a surface energy discharger before coating, which reduces or removes any static charge before coating.

3. A security label according to claim 1, wherein the carrier film substrate plastics material comprises untreated polyester, polypropylene or polyethylene, and each part of the carrier film substrate to which a coating is applied is untreated at the time of coating.

4. A security label according to claim 1, wherein the carrier film substrate is transparent or translucent, and the first layer is clear, so that the first pattern is not visible until the carrier film substrate is removed from the first layer.

5. A security label according to claim 1, wherein the non-affixing polymeric coating of the first layer comprises a short chain polymeric substance, having a two-dimensional structure.

6. A security label according to claim 1, wherein the affixing material of the second layer comprises a long chain polymeric substance, having a three-dimensional lattice structure.

7. A security label according to claim 1, wherein the layer of adhesive material is applied directly to the second layer, and comprises a hot melt adhesive.

8. A security label according to claim 1, wherein the surface energy of the carrier film substrate is reduced by a surface energy discharger before coating, which reduces or removes any static charge before coating, the surface discharger comprising an electrical discharger.

9. A security label according to claim 1, wherein the surface energy of the carrier film substrate is reduced by a surface energy discharger before coating, which reduces or removes any static charge before coating, the surface discharger comprising an electrical discharger in the form of a discharge bar.

10. A security label according to claim 1, wherein the surface energy of the carrier film substrate is reduced by a surface energy discharger before the first layer coating is applied and again after the first layer coating has been applied but before the second layer coating is applied, the surface energy discharger reducing or removing any static charge before coating.

11. A security label according to claim 1, wherein the first layer and the second layer each include a proportion of silicone and the proportion of silicone in the first layer is less than the proportion of silicone in the second layer.

12. A security label according to claim 1, wherein the second layer includes a plurality of affixing polymeric coatings, each of which include a proportion of silicone and each successive second layer coating has an increased proportion of silicone relative to the previously applied second layer coating.

* * * * *